United States Patent [19]
Reimers

[11] Patent Number: 5,167,389
[45] Date of Patent: Dec. 1, 1992

[54] SELF PROPELLED GOLF BAG CART

[76] Inventor: Eric W. Reimers, 1235 Starwood, Missoula, Mont. 59802

[21] Appl. No.: 602,402

[22] Filed: Oct. 22, 1990

[51] Int. Cl.⁵ .............................................. A63B 55/00
[52] U.S. Cl. .................................... 248/96; 180/19.1; 280/DIG. 5; 280/DIG. 6
[58] Field of Search .............. 248/278, 284, 286, 291, 248/292.1, 299, 96; 403/61, 68, 85, 93, 70, 82, 92, 96; 280/DIG. 5, DIG. 6; 180/19.1, 19.3

[56] References Cited

U.S. PATENT DOCUMENTS

| | | | |
|---|---|---|---|
| 1,303,249 | 5/1919 | Brown | 403/68 X |
| 1,468,161 | 9/1923 | Laystrom | 403/61 X |
| 1,822,260 | 9/1931 | Adams | 403/85 X |
| 2,793,871 | 5/1957 | Stableford | 280/DIG. 6 |
| 3,165,330 | 1/1965 | Cotton | 280/DIG. 6 X |
| 3,167,146 | 5/1965 | Rudolph | 180/19 |
| 3,232,367 | 2/1966 | York | 180/19 |
| 3,753,473 | 8/1973 | Hollis | 180/19 |
| 3,867,993 | 2/1975 | Iizuka | 180/19.1 |
| 3,871,464 | 3/1975 | Eden | 180/19 |
| 3,893,532 | 7/1975 | Perlowin | 180/19 |
| 3,896,893 | 7/1975 | Willis | 180/19.1 |
| 3,907,056 | 9/1975 | Thomas | 180/19.1 |
| 3,948,332 | 4/1976 | Tyner | 180/19.1 |
| 3,952,821 | 4/1976 | Craven | 180/19.1 |
| 4,063,612 | 12/1977 | Weiss | 180/195 |
| 4,106,583 | 8/1978 | Nemeth | 180/65 |
| 4,570,731 | 2/1986 | Oaks | 180/19.3 |
| 4,570,732 | 2/1986 | Craven | 180/19.3 |
| 4,805,737 | 2/1989 | Peng | 403/93 X |
| 4,832,362 | 5/1989 | Chen | 280/DIG. 6 X |

OTHER PUBLICATIONS copy of advertisement for "Shedda".
copy of advertisement for "Robo Caddy".
copy of advertisment for "Condor".

Primary Examiner—J. Franklin Foss
Attorney, Agent, or Firm—Michael J. Hughes

[57] ABSTRACT

A self-propelled golf bag car assembly (10) is provided to allow a golfer to walk during a round of golf while having the golf cart (12) and the contents carried by the cart (10). The bag cart (10) includes a plurality of cooperative subassemblies for performing specific functions. The bag cart (10) includes a free subassembly (16), a first drive wheel subassembly (10), a second drive wheel subassembly (20), a caster subassembly (28), a handle subasembly (30), and a hand grip subassembly (32). Each of the drive wheel subassemblies (18, 20) includes a shoulder (22), a motor (26), and a wheel (24) subassembly. Power and control is provided by directly driving a motor (118) associated with each wheel (24) through an electrical subassembly (38). The electrical subassembly includes a battery (48) and a variety of controlling components situated in a manual control box (34), a main power unit (54) the hand grip (32), and an optional remote control unit (36). The bag cart (10) is primarily characterized by direct independent drive of the wheels, compactibility from a use mode to a storage mode, and precise user control from the hand grip (32), or the remote control unit (36). The primary expected usage of the self propelled golf bag cart assembly (10) is by individual golfers on walking courses.

19 Claims, 9 Drawing Sheets

SELF PROPELLED GOLF BAG CART

TECHNICAL FIELD

The present invention relates generally to sporting goods and more specifically to collapsable electrically powered golf bag carts. The preferred embodiment is a golf bag cart adapted to relieve the walking golfer of the burden of carrying equipment while allowing nearly the same freedom of movement available to those carrying their own clubs.

BACKGROUND ART

Although the game of golf is a complex, often difficult endeavor, one aspect of the game remains fundamental; golf equipment must be kept within close proximity of a golfer as he/she moves about the course. Frequently, a golfer will get to the golf ball and discover that the lie and surrounding conditions are not as expected. If all of the clubs are not available for convenient selection a golfer will frequently make a low percentage shot with the wrong club rather than go to the trouble of retrieving the correct club. Therefore, it is desirable to have the entire club selection at hand in the near vicinity of the ball. It is also useful to have other contents of the golf bag, such as golf balls, umbrellas, and the like available for ready access.

Since the earliest beginnings of golf numerous methods have been devised to accomplish this. Among the most popular are; the golf carry bag, with or without a stand mechanism, (adapted to be lifted and carried by the golfer), the power cart (for transporting both the golfer(s) and clubs), and the hand pulled cart. Although the carry bag is the most convenient means of transporting clubs it is also the most burdensome and straining to a golfer. Conversely, the power cart is clearly the least strenuous method of transporting one's equipment, unless caddies are available, a situation which is becoming less common. However, in using a power cart a golfer is foreclosed or discouraged from getting the exercise afforded while walking a round of golf (typically three to seven miles).

The hand pulled cart ("pullcart") offers a golfer the ability to walk a round of golf while avoiding the uncomfortable consequences of carrying a golf bag. Unfortunately, while being generally less strenuous than carrying clubs, pulling a golf cart can also be demanding and put a strain on the golfer,s back, in particular, especially when playing courses having hilly terrain. Consequently, numerous inventors have sought to solve this problem by developing self powered or power asserted golf bag carrying carts. Surprisingly, although several versions have achieved some success, none of the prior art in this field has been able to capture a significant share of the market for golf equipment transport devices. This is due in part to a variety of disadvantages inherent in the teachings. These disadvantages may be illustrated by a short discussion of the relevant art. Most of these devices may be grouped very generally into categories.

The first type is that which utilizes gasoline engines to empower a golf bag cart. An early example of this device is O.M. York Collapsible Power Drive Golf Bag Cart, U.S. Pat. No. 3,232,367. Devices of this nature may provide a collapsible powered golf bag cart, but they suffer the disadvantages of; creating noise in an environment not accepting of such noise, using an energy source susceptible to dangerous leakage during storage and/or transport, and/or adding unnecessary weight.

Another category of prior art includes devices designed to power a golf bag cart by a single electric motor, mounted to a gear box means coupled to a drive shaft. Most often, these types of devices utilize a central drive shaft to directly drive either or both rear wheels. Examples of this types of golf bag cart are disclosed by U.S. Pat. No. 3,907,056 and U.S. Pat. No. 3,952,821. Although devices of this type have the advantages of direct drive schemes they suffer disadvantages with respect to collapsibility and maneuverability. Golf bag carts driven off a common drive shaft cannot maneuvered easily because one wheel may not be slowed down or speeded up with respect to the other. Often this problem may be overcome by use of a differential gear. This solution, however, adds greater expense, weight and complexity to a product designed to be simple, lightweight and dependable. Moreover, direct drive of two wheels by a single draft shaft severely limits the collapsibility by requiring disassembly and reassembly of the direct drive scheme each time the golf bag cart is utilized. A further disadvantage of this type of golf bag cart is that the wheel base is limited to a set width. Often golfers may want a narrow wheel base in order to negotiate a narrow path. Therefore a cart which has adjustable features without jeopardizing the performance of the cart is preferred.

An effort to resolve many of the aforementioned deficiencies may be found in another category of prior art. The devices in this category attempt to drive each wheel independently by separate D.C. electric motors. An early device along this line is disclosed by Perlowin in U.S. Pat. No. 3,893,532. This device makes use of separate electric motors to drive each wheel of a golf bag cart. The Perlowin patent teaches a drive train utilizing an elastic drive belt design and is especially aimed at allowing rearward motion without damage to the motor structures. Furthermore, the two motors are shown to be commonly controlled and will operate at the same speed. Elastic belt systems are useful in avoiding drive train damage from irregularity in terrain, but suffer the disadvantage of being less efficient and more subject to wear then a true direct drive system. Furthermore, a proper gear box design will safeguard against any damage from irregular terrain, without requiring larger electric motors or heavy drive trains. Finally, this structure is not designed to be collapsible.

Another device along this line is disclosed by Nemeth in U.S. Pat. No. 4,106,583. Although this device also has the advantages of dual independent drive means, it suffers the disadvantage inherent in a frictional differential scheme. Frictional differential structures are known to be subject to breakdown over time.

Various commercial devices are also present in the golf marketplace. These include the "Powa Caddy" device, the "Condor" device by Auto Caddy, Inc. of Los Altos, Calif., and the "Robo Caddy" device. These devices have achieved some success but have not sufficiently met the needs of potential users to the extent that they preclude improved entrants into the field.

Each known example prior art suffers from one or more of several disadvantages, such as: (1) The drive train is not direct; (2) both drive wheels are driven off a common drive shaft; (3) the gear box is not designed to withstand the random shocks and jolting experienced during operation on irregular terrain; (4) turning is impeded due to the inability to separately control the speed of each drive wheel; (5) the device is not adjustable to numerous positions; (6) the device is too heavy to be managed by many users, especially when lifting into a trunk of a vehicle; and/or (7) the device is not collapsible to a manageable size. Accordingly, a need remains in the marketplace for truly effective, collapsible, easy to use self powered golf bag cart devices.

DISCLOSURE OF THE INVENTION

Accordingly, it is an object of the present invention to provide a lightweight collapsible electrically powered golf bag cart.

It is another object of the present invention to provide an electrically powered golf bag cart having a direct drive train scheme, with separately powered wheels.

It is a further object of the invention to provide a motorized golf bag cart device which may have a small turning radius.

It is still another object of the present invention to provide a motorized golf bag cart device which is readily adaptable to remote control.

It is yet another object of the present invention to provide alternate control schemes to allow the user to select manual or remote control.

It is a still further object of the present invention to utilize the drive motors as braking devices, thus preventing runaways.

Briefly, a preferred embodiment of the present invention is an electrically powered motorized golf bag cart device adapted for use by a golfer who wishes to walk during a round of golf while having the burden of carrying the equipment borne by the motorized device. The device is adapted to be electrically powered by a battery which may be readily recharged and/or replaced. Furthermore, the device is adapted to be sufficiently lightweight to be easily lifted by the golfer and is also adapted to collapse in such a manner that it will fit in an average automobile trunk.

The self propelled golf bag cart of the present invention is constructed of a plurality of functional subassemblies, each playing an important part in the overall function of the device. The primary structural element is a centrally located main frame subassembly. The main frame subassembly supports the golf bag and is supported above the ground by a pair of drive wheel subassemblies and a separate caster wheel subassembly. The drive wheel subassemblies each include further components in the nature of a wheel subassembly, a drive motor subassembly and a shoulder subassembly. The shoulder subassembly provides for a collapsable and rotatable attachment of the wheel subassembly to the main frame. A handle subassembly provides a means for the user to hold, steer and control the cart. The handle subassembly includes a manual control box near the main frame subassembly, and, at the end of the handle, a hand grip subassembly which is the primary manually operable steering and control mechanism for the electrical circuitry utilized to control the drive wheels. An optional remote control subassembly is provided to allow the golfer to control the speed and direction of the golf cart from a remote position.

The preferred embodiment of the present invention is adapted to be utilized by golfers wishing to walk golf courses, including those courses which have steep terrain which can cause physical discomfort for those carrying their equipment. The self propelled golf bag cart is adapted to provide great flexibility in steering and speed of movement as well as being stable on various types of terrain and to have sufficient power to handle steep hills and sufficient braking capability to descend steep hills without running away. The invention allows the golfer to gain the benefits of walking the golf course without the concurrent problems inherent in carrying the golf equipment on the shoulder or back or dragging a pull cart. This can be very helpful to those golfers with physical problems such as back maladies. The preferred embodiment is adapted for use by a single golfer and carries only a single golf bag and the associated equipment.

An advantage of the present invention is that it allows the golfer to walk a golf course and obtain the inherent exercise benefits thereof without placing a strain on the body from carrying the equipment.

Another advantage of the present invention is that it is adaptable to travel to the very close proximity of the golfer when he/she reaches the golf ball.

Another advantage of the present invention is that it is relatively light in weight and is provided with wide traction wheels, thus causing a minimum amount of potential damage to the terrain of the golf course during usage.

Still another advantage of the present invention is that the direct drive structure provided by the independent wheel motors permits precise control and low turning radius steering of the device.

A further advantage of the present invention is that the electrical drive motors provide a degree of braking force to the wheels such that the cart does not readily travel at speeds higher than those desired by the user.

A still further advantage of the present invention is that the golf bag cart may be collapsed into a relatively small volume for easy storage and for containment in an ordinary automobile trunk.

Yet another advantage of the present invention is that the user may choose to manually control the steering and speed of the cart from the handle grip or may elect to utilize a remote control mechanism to deliver the golf bag cart to a desired location.

Still another advantage of the present invention is that the unique shoulder subassembly permits the wheels to be utilized and stored in a variety of discrete position for maximum utility and collapsibility.

A still further advantage of the present invention is that the utilization of a caster wheel in direct line with the handle allows precise steering and control.

These and other objects and advantages of the present invention will become clear to those skilled in the art in view of the description of the best presently known mode of carrying out the invention and the industrial applicability of the preferred embodiment, as described herein and as illustrated in the several figures of the drawings.

BEST MODE OF CARRYING OUT THE INVENTION

The best presently mode of carrying out the invention is in the form of a self propelled golf bag cart assembly adapted to carry a single golf bag and the associated contents. The preferred bag cart is electrically powered, utilizing a rechargeable battery and may be controlled by the user either manually, utilizing handle mounted controls, or by a remote control mechanism. It is intended that the preferred golf bag cart be utilized by golfers who choose to walk during a round of golf while having the burden of carrying the golf bag mechanically undertaken, without sacrificing convenience, maneuverability and transportability of the entire system.

Figure 1:
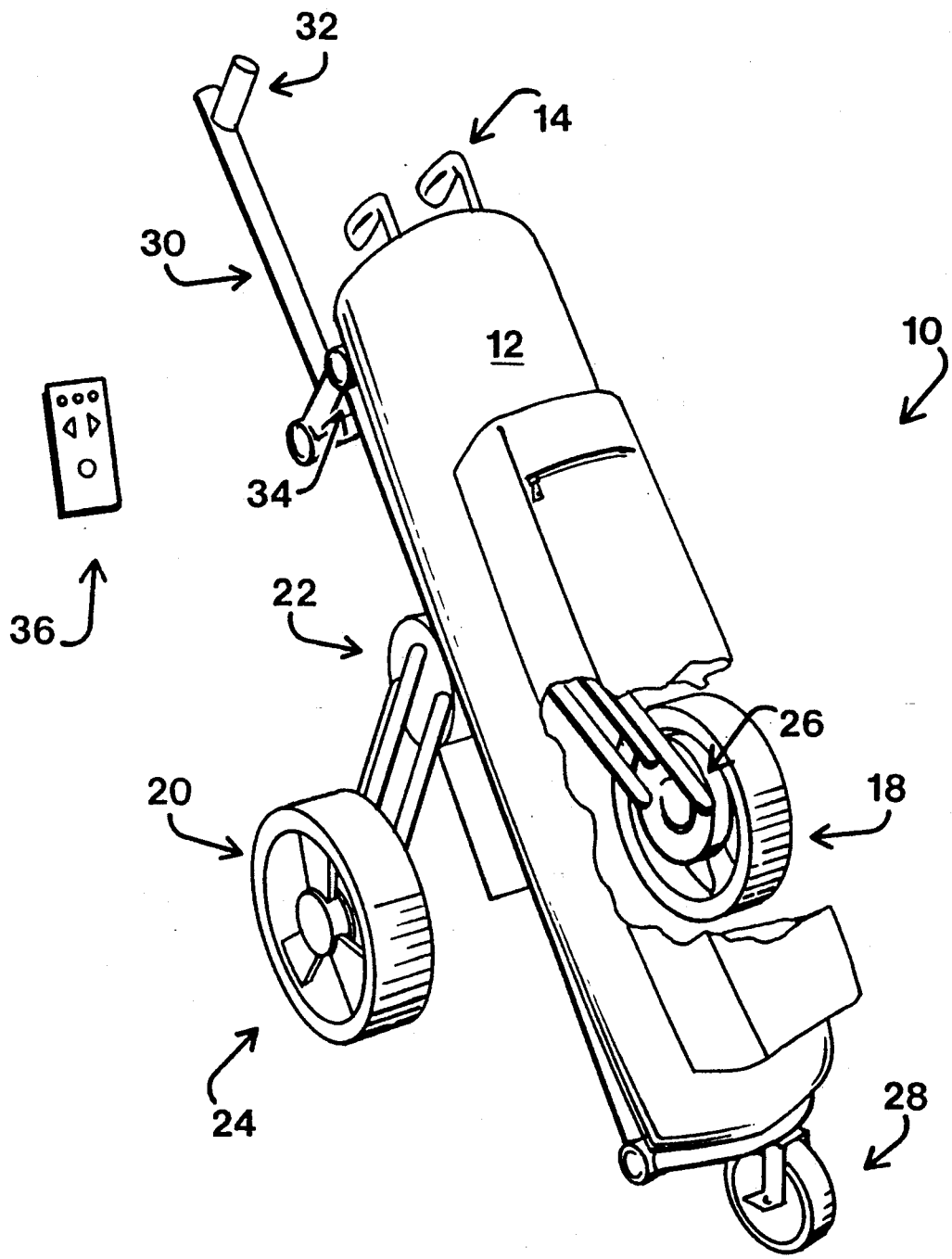
FIG. 1 is a perspective view of a self propelled golf bag cart according to the present invention, in use mode, howing a partially cut away golf bag, including golf clubs, mounted thereon.
Figure 2:
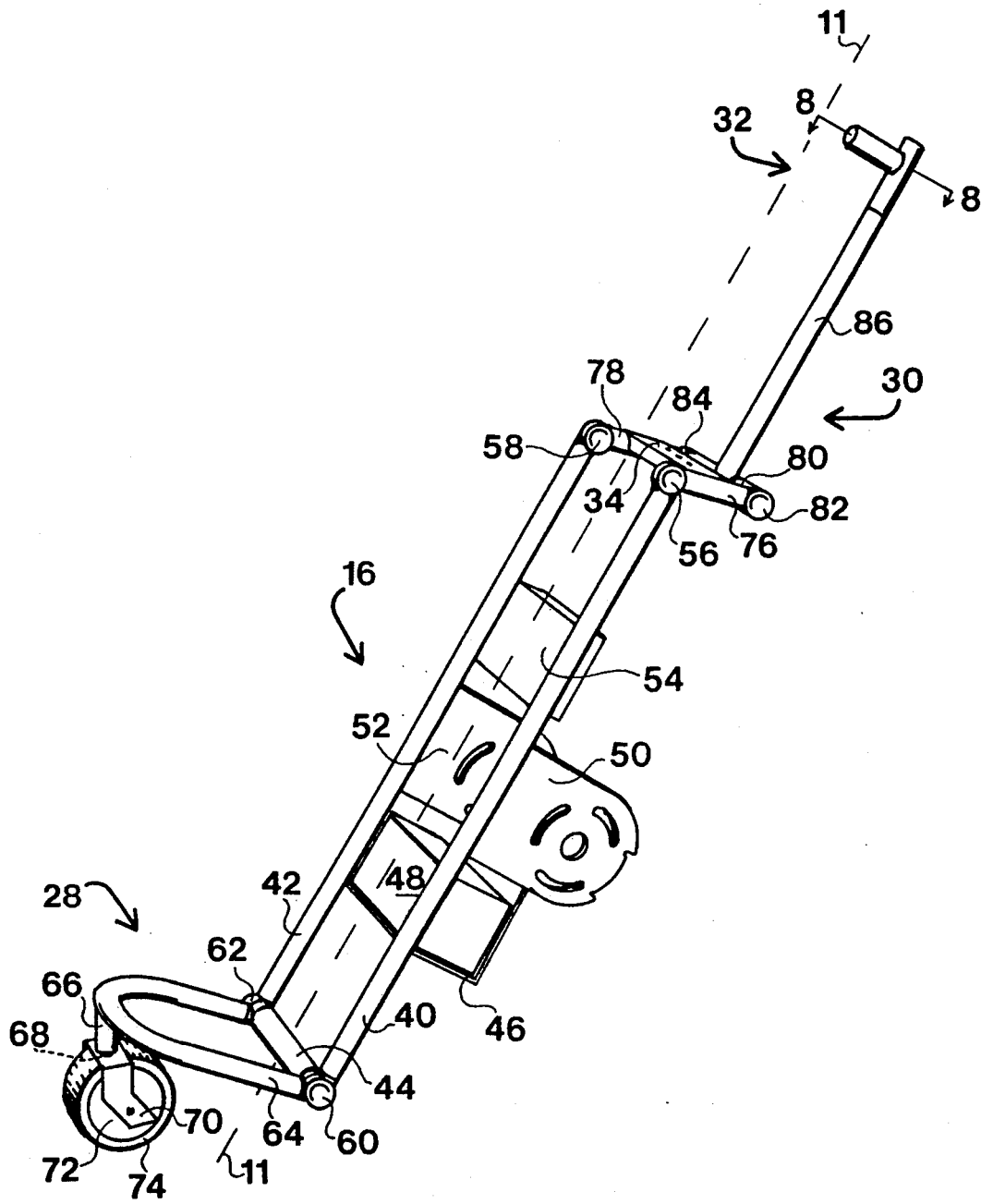
FIG. 2 is a perspective view of the main frame subassembly, the caster subassembly and the handle subassembly.

The preferred embodiment of the present invention is a self propelled golf bag cart assembly which is illustrated in a perspective manner in FIG. 1 and is designated therein by the general reference character 10. The preferred golf bag cart 10 is constructed to be generally symmetrical about a longitudinal axis 11. In normal usage ("use mode", as shown in FIGS. 1 and 2), the longitudinal axis 11 will be offset from the vertical by between 20° and 30°. This allows for maximum rolling stability and accessibility of the controls and contents. In order to illustrate the use of the golf bag cart 10, it is illustrated with a partially cut away golf bag 12 shown as mounted thereon, with the primary contents of the golf bag 12 being a plurality of golf clubs 14.

The golf bag cart 10 is an overall assembly which may be conceptualized as being an aggregation of a variety of subassemblies, each adapted to serve a particular purpose. The primary structural element of the golf bag cart 10 is a main frame subassembly 16 which provides the primary support to the golf bag 12. The main frame subassembly 16 is supported and propelled by a first drive wheel subassembly 18 (left wheel assembly, as illustrated) and a second drive wheel subassembly 20 (right wheel assembly). Each of the drive wheel subassemblies 18 and 20 includes, in a symmetrical fashion with the other, a shoulder subassembly 22, a wheel subassembly 24 and a motor subassembly 26.

Three point rolling (tricycle) support for the main frame subassembly 16 is completed by the addition of a caster subassembly 28. The caster subassembly 28 is adapted to be "free wheeling" in such a manner that it provides steering in a tricycle type fashion while the drive wheel subassemblies 18 and 20 provides the motive power and primary load bearing support.

A handle subassembly 30 is mounted on the main frame subassembly 16 along the axis 11 in a generally opposing fashion to the caster subassembly 28. The handle subassembly 30 terminates in a hand grip subassembly 32 which includes the maneuvering control mechanisms for the golf bag cart 10. The handle subassembly 30 also includes a manual control box 34 which includes user settable controls and warning indicators.

An optional remote control subassembly 36 is also provided to allow the golfer to control the speed and direction of the golf bag cart 10 from a remote location. The remote control subassembly 36 utilizes control signals delivered over radio, infrared or analogous electromagnetic waves to perform a subset of the same functions which may be manually controlled from the manual control box 34 and the hand grip subassembly 32.

An electrical subassembly 38 provides and distributes the motor power and control signals for the golf bag cart 10. The electrical subassembly 38 is dispersed throughout the golf bag cart 10 with portions situated in each of the subassemblies except for the caster subassembly 28.

Although it is understood that the various subassemblies must be combined and interact in order to achieve all of objects and advantages of the golf bag cart 10, it is appropriate to consider them in a somewhat separate manner for maximum understanding. Of course, the unitary construction has distinct advantages over prior art structures which often require assembly for use and disassembly for storage. With the exception of the electrical components, the various subassemblies perform more or less independent functions. Each of the subassemblies is specifically constructed to perform these functions in the best known manner.

Referring now to FIG. 2 the main frame subassembly 16, the caster subassembly 28, and the handle subassembly 30 are illustrated in a perspective manner. In this illustration it may been seen that both the caster subassembly 28 and the handle subassembly 30 are pivotally mounted to the main frame subassembly 16. In addition, the handle subassembly 30 includes a second displaced pivot to allow maximum collapsibility and adjustability to the user's preference.

The main frame subassembly 16 includes a central section in which the primary structural members are first frame tube 40 extending longitudinally parallel to the primary axis 11 of the bag cart 10 and a parallel second frame tube 42 which is displaced from the first frame tube 40. This structure provides a "ladder type" chassis which provides two line support to the golf bag 12, thus eliminating the need for special support brackets found on many bag carts.

A bottom buttress tube 44 connects the lower ends of the frame tubes 40 and 42. A battery mount plate 46 is mounted on the first and second frame tubes 40 and 42 at a position above the bottom buttress tube 44. The battery mount plate 46 is adapted to support an electrical battery 48 which provides the electrical power to the bag cart 10 through conventional electrical wiring 49, extending therefrom. In the preferred embodiment 10, the battery 48 is a rechargeable lead acid battery having a power rating of 28 to 30 AH, a voltage rating of 12 V and a typical lifetime of approximately 36 holes of golf prior to recharging. The battery 48 is of the same nature as standard automobile batteries and is adapted to be recharged by connecting to conventional battery charger units which may be connected to AC power sources, such as an ordinary wall socket. In addition to electrical power, the relatively heavy battery 48 also provides balancing ballast to help prevent the fully loaded bag cart 10 from tipping forward toward the handle 30.

The interface between the first drive wheel assembly 18 and the main frame subassembly 16 is provided at a first shoulder mount 50 which is mounted on the first frame tube 40. Similarly, a second shoulder mount 52, which is secured to the second frame tube 42, provides the attachment point for the second drive wheel subassembly 20.

A main power unit 54 is mounted on the main frame subassembly 16 at a position above the shoulder mounts 50 and 52. The main power unit 54 contains electrical components (see discussion relating to FIG. 10, hereinafter) which modify, control and transmit the power delivered through the electrical wiring 49 from the battery 48 into the power for controlling the motor subassembly 26 and the remainder of the electrical subassembly 38. The main power unit 54 includes a main on/off power switch 55 (See FIGS. 6 and 10) for the electrical subassembly 38.

The first frame tube 40 and the second frame tube 42 terminate at their respective upper ends with a first upper pivot mount 56 and a second upper pivot mount 58. The upper pivot mounts 56 and 58 provide an adjustable, fixable pivot mount for attaching the handle subassembly 30 to the main frame subassembly 16 in a manner such that the angle of the handle subassembly 30 to the main frame subassembly 16 may be adjusted to the comfort of the user and to also allow desired access to the manual control box 34. It is noted that, in the preferred embodiment 10, no upper corollary to the bottom buttress tube 44 is provided. Such a member is not considered necessary and could have an affect of interfering with the manner of which the golf bag 12 rests on the main frame subassembly 16, so no such member is provided.

A first caster pivot mount 60 and a second cast pivot mount 62 are provided at the interface between the frame tubes 40 and 42 and the caster subassembly 28. The caster pivot mounts 60 and 62 are also attached to the bottom buttress tube 44 in such a manner that the bottom buttress tube 44 will rotate with a portion of each of the caster pivot mounts 60 and 62.

Figure 3:
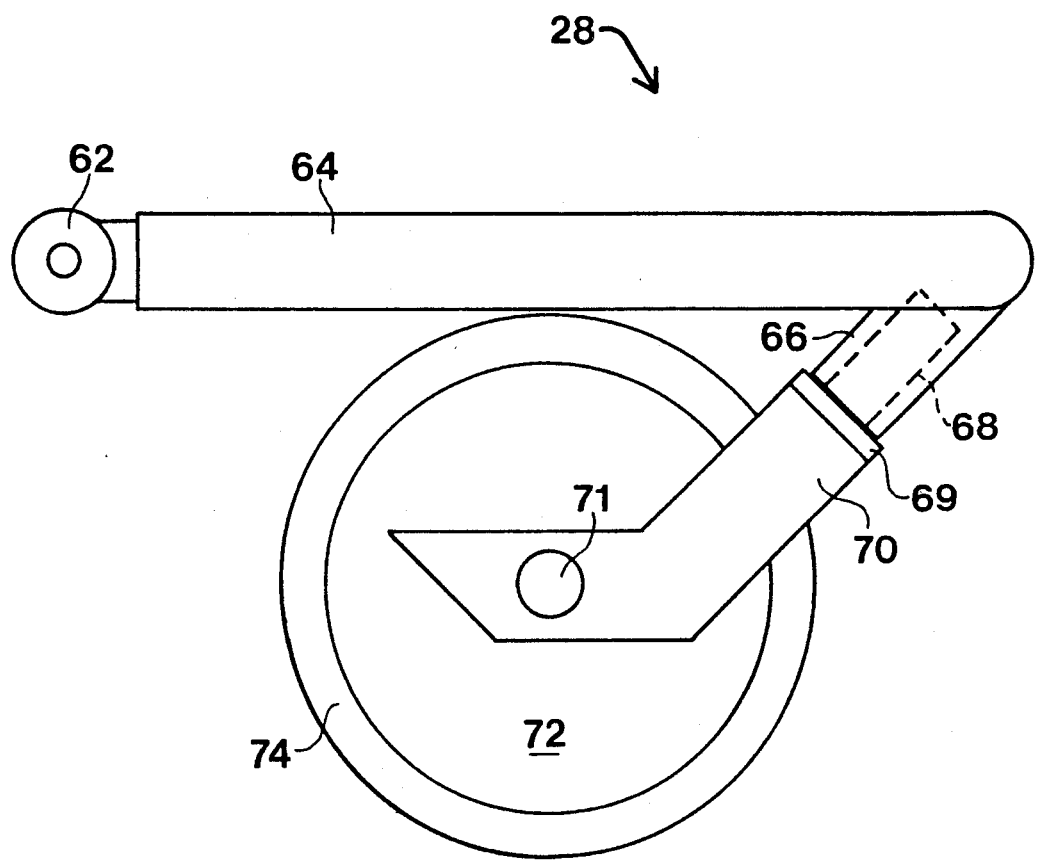
FIG. 3 is a right side elevational view of the caster subassembly.

The construction of caster subassembly 28 may be seen in consideration both FIG. 2 and of FIG. 3, in which the caster subassembly 28 is illustrated in a right side elevational view. The caster subassembly 28 pivotally connects to the main frame subassembly 16 at the caster pivot mounts 60 and 62. A bag bottom support member 64 is a U-shaped member which attaches at both end to the caster pivot mounts 60 and 62. The bag bottom support member 64 provides the support structure which holds the bottom of the golf bag 12 and prevent slippage. The dimensions of the bag bottom support member 64 are selected to provide solid support to the frames of typical golf bags 12.

At the end of the golf bag bottom support member 64 (the bottom of the "U-shape"), a caster pivot tube 66 depends from the bag bottom support 64 (see, esp., FIG. 3). The caster pivot tube 66 is a hollow member adapted to receive a caster pivot pin 68 therein in a rotatable fashion. Once inserted within the caster pivot tube 66, the caster pivot pin 68 is secured axially in position while remaining free to rotate, by a lock nut 69 which attaches to the bottom of the caster tube 66. The caster pivot pin 68 is affixed to the top of a caster wheel mount 70 which extends downward and attaches by way of a caster hub 71 to the caster wheel 72. The caster wheel 72, which is provided with a caster tire member 74, provides a rolling tricycle support and steering wheel structure which is aligned longitudinally along the axis 11 with the handle subassembly 30, such that the caster subassembly 28 may be utilized for steering the entire golf bag cart 10. The dimensions of the caster wheel 72 and the caster tire 74 are selected so as to provide easy and compact folding of the device, as it is more thoroughly discussed in relation to FIG. 6 hereinafter, and also to provide an easily steerable, yet broad base, traction surface upon the ground. Since the caster subassembly 28 is a load bearing portion of the golf bag cart 10 it is desirable to have a broad traction surface on the caster tire 74 to avoid any damage to the terrain of the golf course, particularly when sharp turns are being made.

The swiveling caster 28 allows the cart 10 to be turned easily while all of the wheels remain on the ground. This tripod aspect, with the support structure situated well above the ground which allows "climbing" over shallow curbs and the like without undue effort on the part of the user.

The structure of the handle subassembly 30 includes a segment in the vicinity of the manual control box 34 and another, pivotally, connected, segment extending outward to the hand grip subassembly 32. The sector surrounding the control box 34 includes a first box frame tube 76 which attaches to the first frame tube 40 at the first upper pivot mount 56, and a second box frame tube 78, parallel to the first, which attaches to the second frame tube 42 at the second upper pivot mount 58. A lateral handle tube 80 extends between the opposing ends of the box frame tubes 76 and 78 and is pivotally mounted thereon by way of a first handle pivot 82 and a second handle pivot 84. The manual control box 34 is mounted across between the box frame tubes 76 and 78 (See FIG. 7).

The handle pivots 82 and 84 allow the lateral handle tube 80 to rotate about an axis perpendicular to the main axis 11 such that a longitudinal handle tube 86, which is mounted on the lateral handle tube 80, may be adjusted as to height with respect to the golfer. The hand grip subassembly 32 is mounted on the end of the longitudinal handle tube 86. The longitudinal handle tube 86 is rotably attached to the lateral handle tube 80 such that the orientation of the hand grip 32 may be altered for storage. The hand grip 32 may also be used to provide manual steering, in much the same manner as conventional unpowered carts.

The manner in which the handle assembly 30 is caused to fold and rotate in order to achieve a compact storage and transport mode is discussed more thoroughly in relation to FIG. 6 hereinafter.

Figure 4:
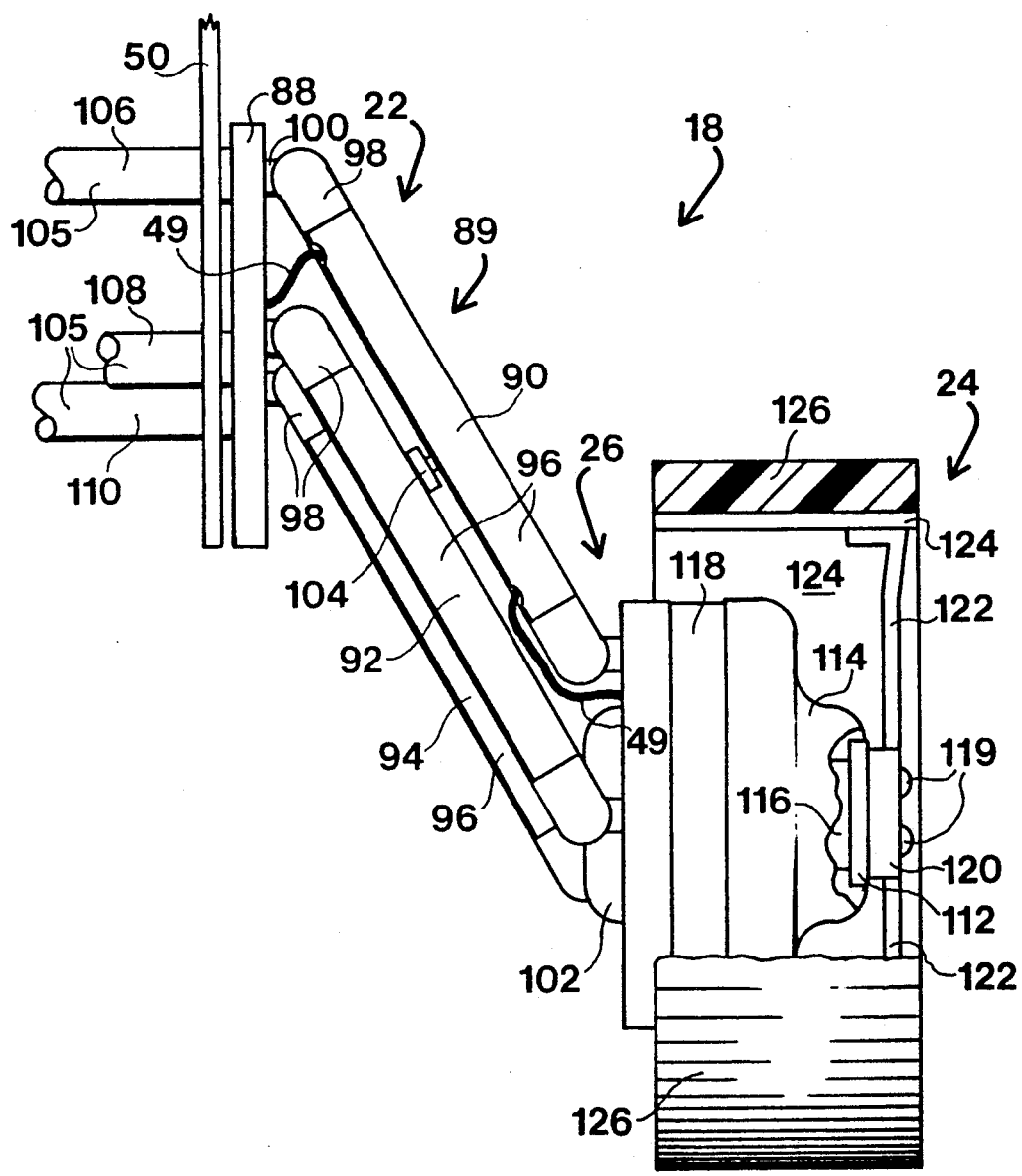
FIG. 4 is a partially cut away front elevational view of one of the drive wheel subassemblies.

Referring now to FIG. 4, the first drive wheel subassembly 18 (for example only, the second drive wheel subassembly 20 being symmetrical and substantially identical in appearance and structure) is illustrated in a partially cut away front elevational view. In this illustration the three primary subassemblies which constitute the first drive wheel subassembly 18 are illustrated to show respective interactions. The shoulder subassembly 22 provides the mechanical connection between the wheel subassembly 24 and the main frame subassembly 16 and also provides a mechanism by which the position of the wheel subassembly 24 may be adjusted between the "use mode" of FIG. 1 and the "storage mode" of FIG. 6. The motor subassembly 26 provides the interface between the shoulder subassembly 22 and the wheel subassembly 24 and also provides the power for driving the wheel subassembly 24.

Figure 5:
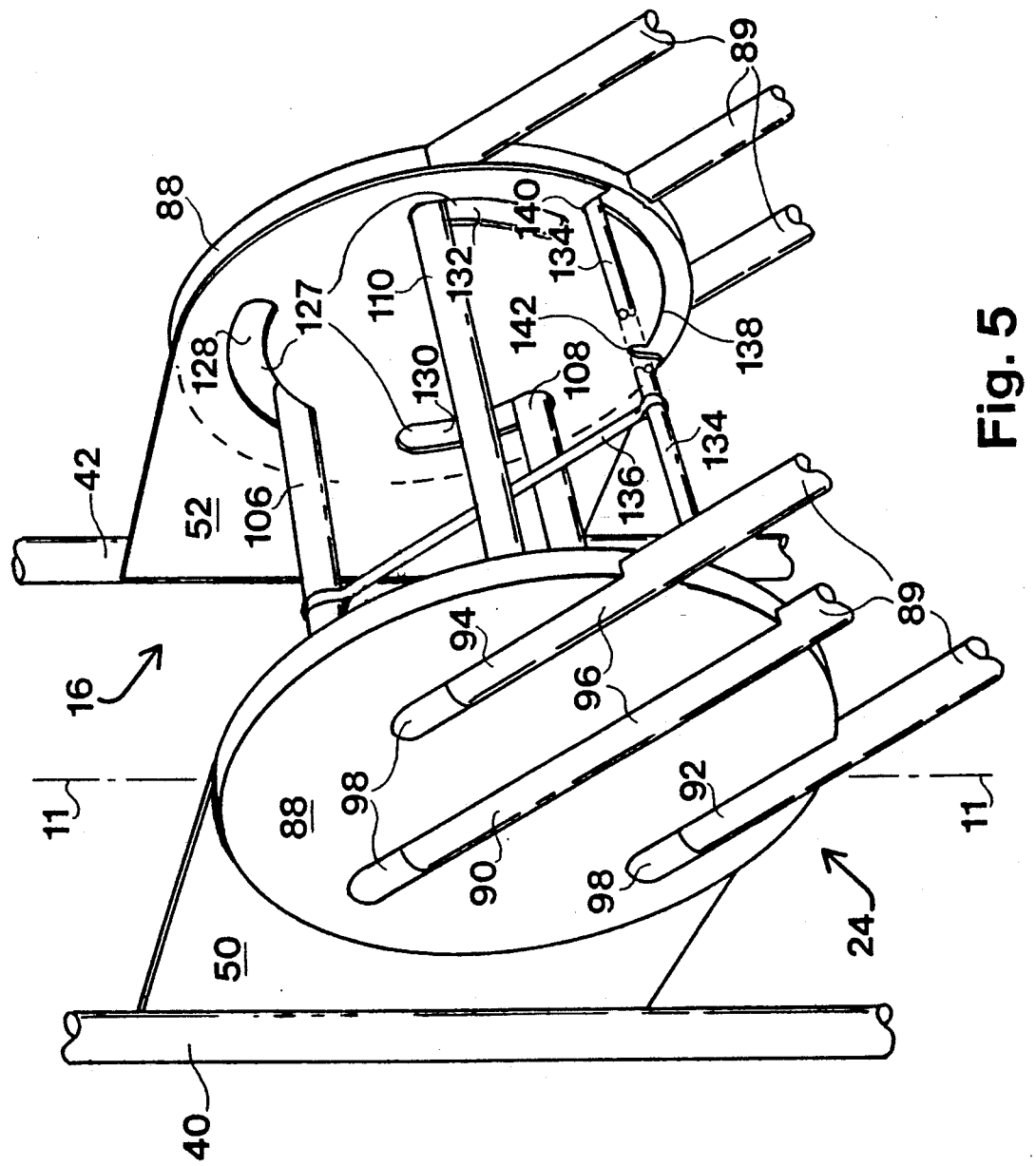
FIG. 5 is a perspective view of the shoulder subassemblies and the associated portions of the main frame subassembly.

The shoulder subassembly 22 is also illustrated in FIG. 5, which shows the manner in which the opposing shoulder subassemblies 22 interface with the main frame subassembly 16 in order to provide specific positioning and locking. FIG. 4 primarily illustrates the manner in which the shoulder subassembly 22 acts to connect the main frame subassembly 16 to the wheel subassembly 24.

It may be seen that the upper connection between the shoulder subassembly 22 and the main frame subassembly 16 is accomplished by an interface between a shoulder plate 88 and the (first) shoulder mount 50. The shoulder plate 88 is a generally circular disk which is mounted so as to be flat against the shoulder mount 50, and is free to rotate with respect thereto. Three arm members 89, being a center arm member 90, a first outside arm member 92 and a second outside arm member 94 (see FIGS. 5 and 6), are mounted on the outside face of the shoulder plate 88 with the connections being arrayed at the apexes of an equilateral triangle. Each of the arm members 89 is of similar construction and includes an arm tube 96 forming the central span and a pair of end inserts 98, one located at each end. The end inserts 98 of each of the arms 89 is respectively connected by way of an end connector 100 to the shoulder plate 88 at the upper end and to a motor housing 102 at the lower end. The connection of the arms 89 to the motor housing 102 is also in the form of an array of the apexes of an equilateral triangle with the arms 89 being maintained in lateral separation with respect to each other throughout.

The end connectors 100 and the end inserts 98 are pivotally connected to allow the arm tubes 96 to pivot only in a vertical direction in the orientation of FIG. 4, with the physical contact of the end connectors 100 limiting the degree of motion. The arm tubes 90 are not permitted to rotate with respect to the shoulder plate 88 or the motor housing 102. In this manner, the entire drive wheel subassembly 18 is slaved as to rotational position to the shoulder plate 88 and the rotational location of the wheel subassembly 24 will be determined by the positioning of the shoulder plate 88.

Figure 6:
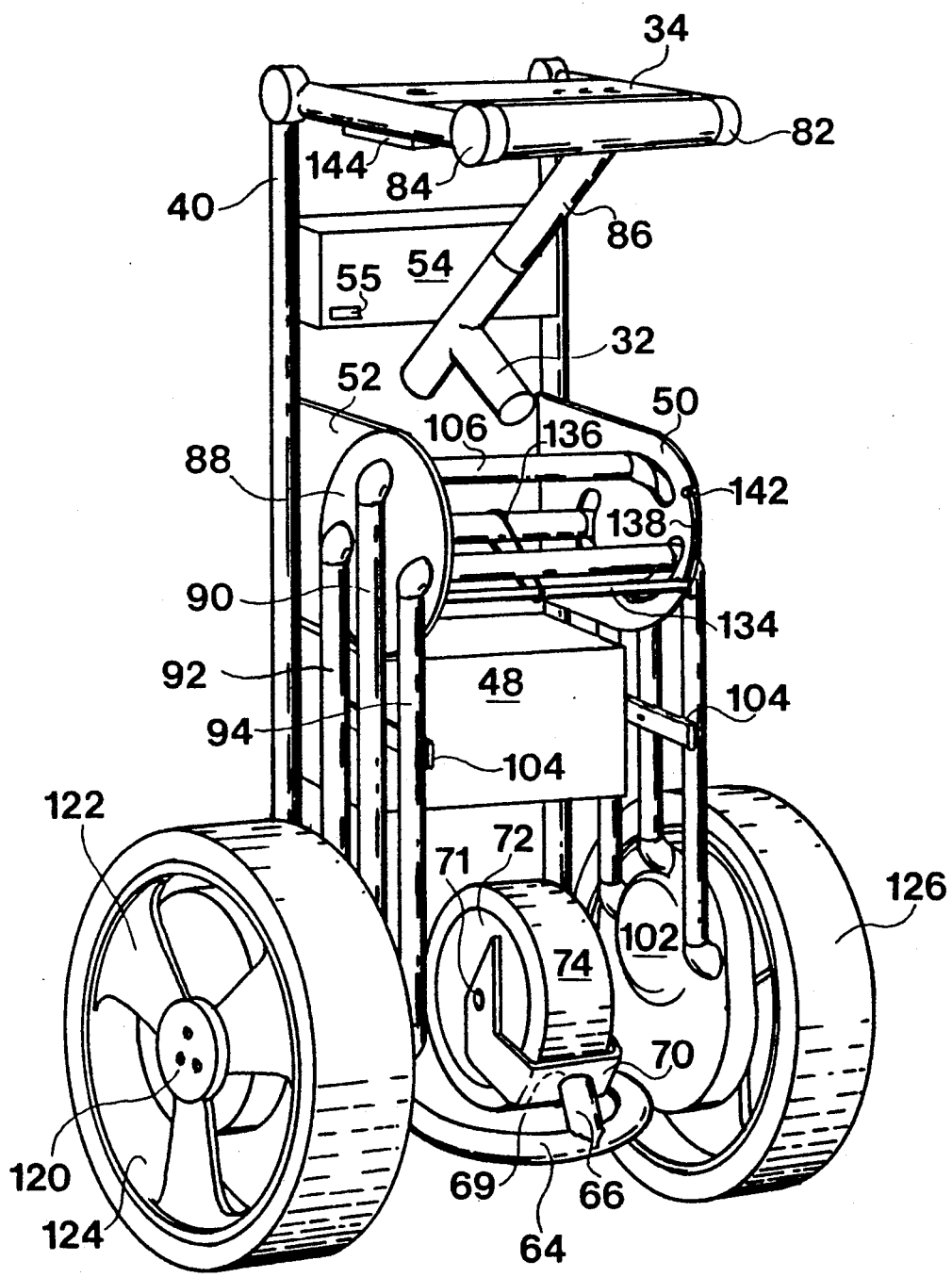
FIG. 6 is a perspective view of the preferred embodiment, shown collapsed for transport and storage.

An arm lock member 104 is provided on the center arm 90 in order to secure the relative position of the arm members in either a fully extended position, such as shown in FIG. 4, or in a fully retracted position as shown in FIG. 6. The arm lock member 104 of the preferred embodiment 10 is merely a pivoting bar member which wedges between or beside the arm members 89. The arm lock 104 forces the center arm 90 and the outside arms 92 and 94 on opposite sides of the arm lock 104 in the extended position (FIG. 4). The arm lock 104 is situated on the same side of each of the arm members in the closed position (FIG. 6), thereby preventing the lateral separation of the outside arms 92 and 94 from the center arm 90, and thereby effectively preventing lateral extension of the wheel subassembly 24. In each case the position may be secured by the arm lock 104 restricting only one direction of movement because the end inserts 98 and end connectors 100 prevent movement in any other direction.

As is more fully discussed in connection with FIG. 5, hereinafter, the shoulder plate 88 is connected to the corresponding snoulder plate 88 on the second drive wheel subassembly 20 by three load bearing cylinder members 105 which extend laterally across the main frame subassembly 16. These include a first cylinder 106, a second cylinder 108 and a third cylinder 110. The cylinders 105 provide the load bearing structure for connecting the shoulder subassembly 22 to the main frame subassembly 16.

The wheel subassembly 24 is attached to the motor subassembly 26 by a connection between the wheel subassembly and a a drive shaft plate 112, which is part of the motor subassembly 24. The drive shaft plate 112 rotates with respect to a gear box housing 114 as the drive shaft plate 112 is turned by a gear structure 116 which is connected through the gearing mechanism to an electrical disk motor 118. The electrical disk motor 118 provides the rotational energy to drive the wheel subassembly 24. A plurality of wheel bolts 119 secure the attachment.

The preferred embodiment 10 includes a direct drive structure in which each of the wheel subassemblies 24 is directly driven by an independently controlled motor subassembly 26. In this structure the electrical disk motors 118 are connected through the gear structure 116 to the wheel selected permit direct drive of the wheel subassembly 24 at speeds which are appropriate to the average golfer and golf course. The speed is controlled by adjusting the power delivered to the motors 118, as discussed more fully with respect to FIG. 10. Furthermore, the gear structure 116 is selected to operate with the electrical disk motor 118 in such a manner that sufficient power is delivered to the wheel subassembly 24 to drive fully loaded bag cart 10 up a relatively steep incline.

No differential mechanism is provided in the gear structure 116 since it is intended that the structure be direct drive in nature and that the electrical disk motor 118 should provide braking force to the bag cart 10 when desired. Thus, the magnetic structure of the electrical disk motor 118 resist turning of the wheel subassembly 24 when the motor is off and further resist to turning at a speed higher than the rotational speed of the disk motor 118, as selected by the golfer. This is highly desirable at preventing runaways of the golf cart 10 on steep hills and also to prevent the golf cart 10 from moving when the power is off. The elimination of the differential capability obviates the need for other types of braking mechanism.

In the preferred embodiment 10 the type of disk motor 118 is selected is a SSW111S1 Pancake type DC motor. The gear structure 116 is selected to be a multilayer planetary gear structure having a gear reduction ratio of sixteen to 1. Both the motor 118 and the gear structure 116 are selected for lightweight durable construction as well as power and rotational specifications. This is accomplished in order to minimize weight for easy lifting by the average golfer and also to minimize volume for storage capability.

Each wheel subassembly 24 includes a central hub 120 which is attached to the drive shaft plate 112 by the wheel bolts 119. A spoke plate 122 extends outward from the central hub 120 to a circumferential rim 124 which supports a tire 126. The spoke plate 122 is selected to be thin and to have holes formed there through at various position (See FIG. 1 and FIG. 6) to minimize weight. The spoke plate 122 in the preferred embodiment 10 is constructed of a strong, lightweight material such as aluminum or structural plastic. The spoke plate 122 is situated near the outside edge of the wheel subassembly 24 such a very substantial portion of the motor subassembly 26 is physically located within the rim 124. This is desirable both to protect the motor structure and to maximize compactability for storage. The rim 124 is a lightweight but strong structural plastic having a width sufficient to support the tire 126 such that the traction base is wide enough to avoid any damage to the golf course. The tire 126, including traction ribs on the surface thereof, while not pneumatic in nature, is selected to have a sufficient degree of compressibility that it provides excellent traction and avoids causing tearing of the terrain. A pliable rubber is selected for the tire 126 and in the preferred embodiment 10 the selection is natural rubber, although certain synthetic rubber materials are also acceptable.

Referring now to FIG. 5, the interaction of the opposing shoulder subassemblies 24 with the main frame subassembly 16 is illustrated in a perspective manner. This illustration shows both shoulder subassemblies 24 and the first and second shoulder mount plates 50 and 52. In this illustration, the bag cart device 10 is shown with the drive wheel subassemblies 20 and 22 in the rear and extended mode, which is standard for use and is illustrated in FIG. 1. In this illustration the main axis 11 is in the same orientation as FIG. 1.

It may be seen that the second shoulder mount plate 52 includes three arc shaped cylinder receiving slots 127 which are adapted to receive the load bearing cylinders 105 which connect the opposing shoulder plates 88. The same configuration exists on first shoulder plate 50, but is not visible in this view. Each of the shoulder plates 50 and 52 includes a first arc slot 128, adapted to receive the first cylinder 106 there through; a second arc slot 130 corresponding to the second cylinder 108 and a third arc slot 132 corresponding to the third cylinder 110. Each of the arc slots 127 allows the respective cylinder 105 to slide therein for a limited distance in an arcical fashion. This allows the shoulder plate 88 to rotate within a short arc about a central rotational axis, which axis is perpendicular to the main axis 11. The contact between the cylinders 105 and the receiving slots 127 provides the support of the main frame subassembly 16 on the shoulder subassembly 24. For this reason, the cylinders 105 are relatively strong structural materials and the shoulder mount plates 50 and 52 are thick in order to provide a solid support base.

The preferred embodiment 10 is adapted to be utilized in two different rotational modes for the position of the wheel subassembly 24 with respect to the longitudinal axis 11. In the use mode, shown in FIGS. 1 and 5, the alignment of the arm members 90 is at an angle offset between 60° and 70°, in the preferred embodiment 67, from the angle of the longitudinal axis 11 with respect to the ground. This means that in the use mode the center arm members 90 will lie in a common, nearly vertical, plane, thus providing maximum support to the main frame subassembly 16.

The positioning is maintained in this orientation by locking the rotation of the shoulder subassembly 24 such that each of the load bearing cylinders 105 is positioned at one end of the respective arc receiving 127. A lock bar 134 is attached by a spring cord 136 to the first cylinder 106 is held thereby against the surface of a lock detent 138 formed in each of the shoulder support plates 50 and 52. The lock bar 134 slides within the lock detent 138 between one terminal end, being defined as a use mode notch 140 (positioning illustrated in FIG. 5) and a storage mode notch 142 (positioning illustrated in FIG. 6). The length of the lock detent 138 is selected to allow the shoulder plate 88 to rotate 67° such that the drive wheel subassembly 24 may rotate between the use of mode FIG. 1 and storage mode of FIG. 6, at which point the center arm members 90 are arrayed in a generally vertical plane and are essentially parallel to the longitudinal axis 11.

Referring now to FIG. 6, the storage mode of the golf bag cart 10 is illustrated. In this mode, it may be seen that the golf bag cart may be compactly folded such that it occupies a minimum volume for storage and transport. The handle subassembly 30 is rotated such that the longitudinal handle tube 86 extends downward and parallel to the frame tubes 40 and 42 and logitudinal handle tube 86is turned sideways such that the hand grip 32 is generally parallel to the bottom buttress tube 44. In this manner the handle subassembly 30 is folded inward to occupy minimum space.

Similarly, the caster subassembly 28 is folded inward by rotating the bottom buttress tube 44 on the caster pivot mounts 60 and 62 such that the caster wheel 72 is folded upwards and locked into the space directly beneath the battery 48. In tnis position the bag bottom support member 64 acts as a base to hold the bag cart 10 in a vertical orientation for storage.

The drive wheel subassemblies 18 and 20 are then rotated on the shoulder plates 88 from the use mode notch 140 to the storage mode notch 142. The drive wheel subassemblies 18 and 20 are also compressed laterally from the expanded or spread mode illustrated in FIGS. 1 and 3, with the arm lock 104 extending between the arm members 89 to the flat mode illustrated in FIG. 6 where the arm lock 104 extends on the same side (inside) of each the arm members 89. In the storage mode of FIG. 6, the inside surfaces of the tires 126 abut against the main frame tubes 40 and 42, thus causing the drive wheel subassemblies 18 and 20 to occupy a minimal volume.

In the preferred embodiment 10 the maximum extended length of the device 10 from the tip of the caster wheel 72 to the end of the hand grip subassembly 32 is 14 cm, the front to back maximum distance is 124 cm (49 in), the maximum height is 98 cm (38.5 in) and the maximum width between the exterior edges of the opposing wheel subassemblies 24 is 71 cm (28 in). On the other hand, in the compressed storage mode of FIG. 6, the height of the device is 87.5 cm (34.5 in), the depth is 36 cm (14 in) and the maximum width at the wheels is 46 cm (18 in). The compressed storage mode is thus small enough to fit into the average automobile trunk.

Figure 7:
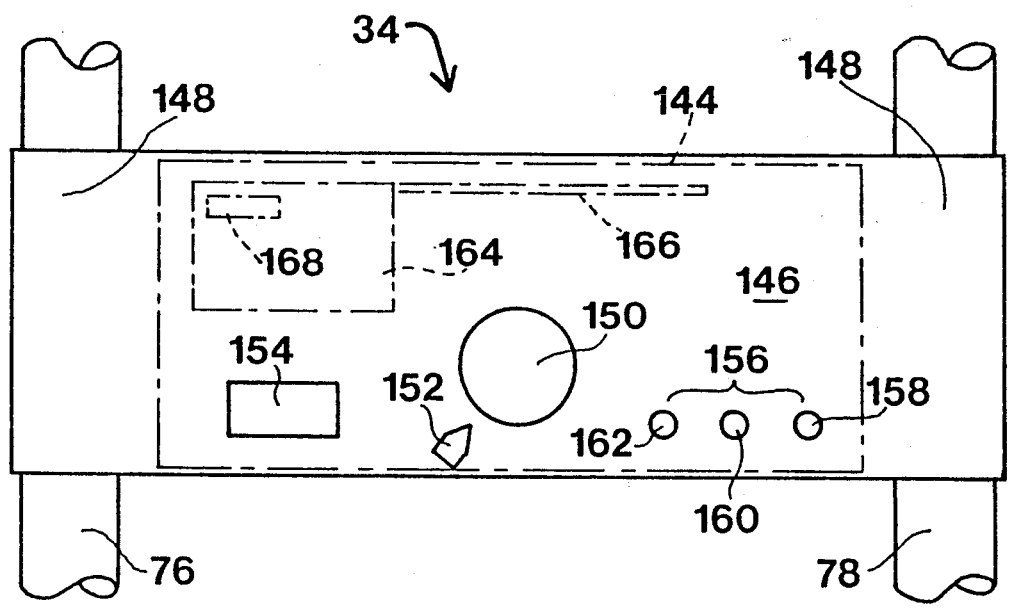
FIG. 7 is a top plan view of the manual control box.

Referring now to FIG. 7, the manual control box 34 is illustrated in a top plan view, with the bottom of the drawing corresponding to the edge of the control box nearest the lateral handle tube 80. In this illustration that it may be seen that the manual control box 34 includes a box frame 144, shown in phantom, in which the electrical and electronic components are contained, and a cover plate 146 which mates with the box frame 144. The cover plate is shown to have a pair of attachment extensions 148 extending beyond the lateral edges of the box frame 144. The attachment extensions 148 serve the purpose of attaching the control box 34 to the first box frame tube 76 and the second box frame tube 78.

A variety of user accessible controls are situated on the cover plate 146. Centrally located is a timer control 150. The timer control 150 is a rotatable control knob which allows the user to set the golf bag cart 10 for automatic forward motion for a specific desired length of time. The period of time selected is indicated by setting the timer control 150 with respect to a timer arrow mark 152 formed or marked on the cover plate 146. For typical usage, the timer circuitry (not shown) will be adjusted to allow the minimum setting on the timer control knob 150 to be approximately five seconds while the maximum setting is approximately fifteen seconds. When the timer control knob 150 is moved to an on position the cart will proceed in a straight line for the period of time indicated, with the speed of the cart having been previously set by the user using the handle grip 32 or the remote control 36.

The manual control box 34 also includes elements relating to the power remaining in the battery 48. A low battery buzzer switch 154 is provided to permit the user to activate or deactivate an audible buzzer which is set to indicate when the power remaining in the battery 48 is becoming unacceptably low. The battery buzzer switch 154 is in a nature of a slide or wheel switch which may be set to either "on" or "off" and may also include a feature which allows adjustment of the volume of the buzzer. When the battery buzzer switch 154 is in the on position the user will be warned of a low battery condition by an audible buzz which may be turned off by moving the battery buzzer switch 154 to the "off" position.

The condition of the battery 48 is further indicated to the user by a set of indicators lamps 156 the ends of which extend through the cover plate 146. In the preferred embodiment 10 the indicator lamps include a green lamp 158, an amber lamp 160 and a red lamp 162. In the preferred embodiment 10 the green lamp 158 is utilized to indicate that the unit is turned on and also the power of the battery 48 is sufficient for normal operation (that is, more than nine holes of operation on a golf course of standard terrain.) The amber lamp 160 is utilized to indicate to the user that the power reserve level has dropped below the nominal full charge level and that the user should recharge the battery 48 prior to disembarking the club house onto the golf course. The amber lamp 160 is ordinarily used to indicate three to eleven nominal golf holes of power remaining in the battery. The red lamp 162 is utilized to indicate an extremely low battery condition. In the preferred embodiment 10 the red lamp 162 is first activated when the battery power is approximately sufficient for three more holes of typical usage. This should indicate to the user that it is time to head back to the clubhouse and to not rely on the cart for more than a very few more holes.

It is noted at this point that the direct drive structure of the wheel subassemblies 24 and the motor subassemblies 26 cause the disk motor 118 to be engaged with the wheel subassembly 24 at all times. Therefore, in order to manually push or pull the device 10, the user must overcome the braking force provided by the disk motors 118. The disk motors 118 are selected to have sufficient braking force that runaways are prevented on hilly surfaces, but not so much that the force cannot be overcome. However, the average user would not want to push or pull the cart 10 for an extended distance with a dead battery.

An optional remote control receiver module 164 is also adapted to be contained within the manual control box 34. The remote control module 164 is illustrated in phantom in FIG. 7. In this illustration it may be seen that the remote control module 164 includes a receiving antenna 166 and a frequency selector module 168. The function and operation of the optional remote control module 164 will be discussed more thoroughly in relationship to the discussion of the remote control unit 36 illustrated in FIG. 9.

Figure 8:
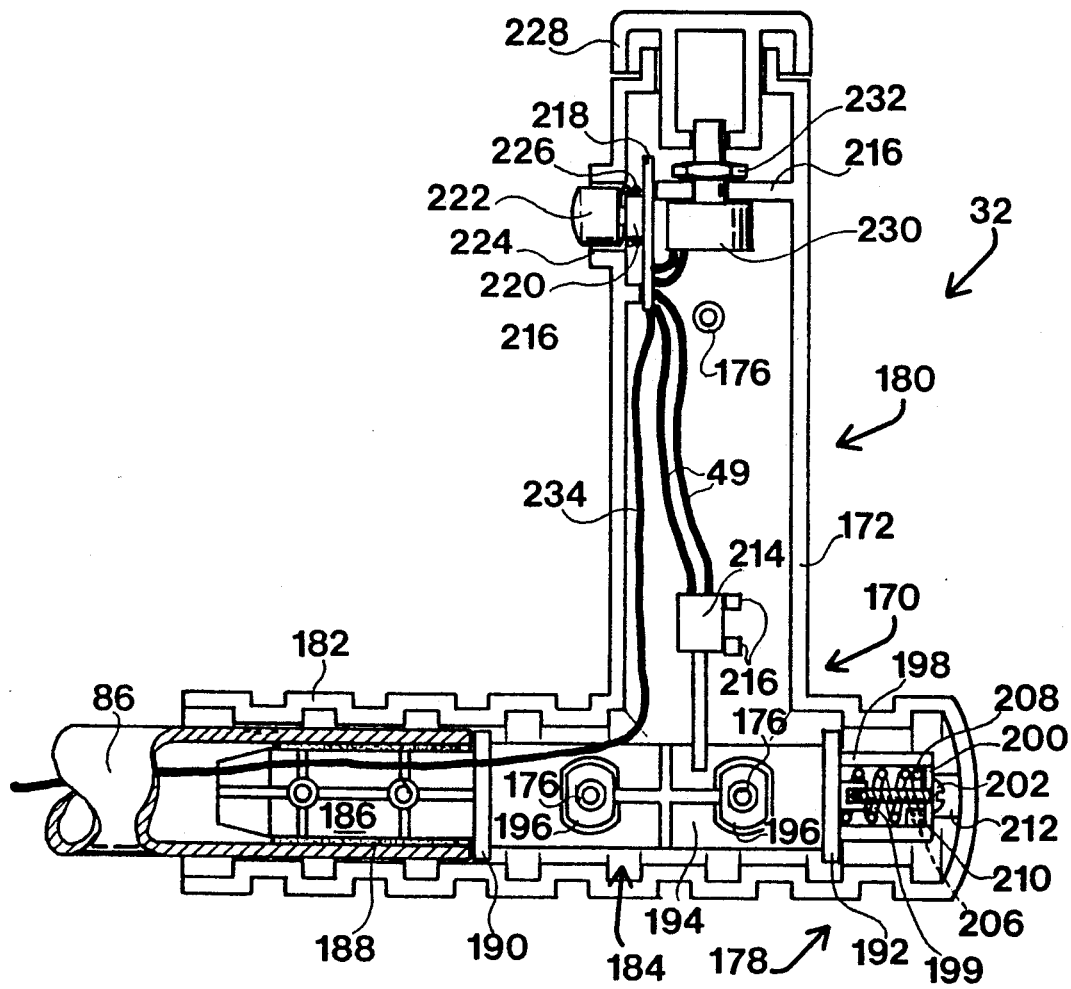
FIG. 8 is a cross sectional view taken along line 8—8 of FIG. 3, showing the structure of the hand grip subassembly.

Referring now to FIG. 8, the control structure of the hand grip subassembly 32 is illustrated in a cross sectional view. This view is partially in cross section and partially shows the hand grip subassembly 32 as being disassembled. The disassembly is possible because the hand grip subassembly 32 includes an exterior grip frame structure 170 which is formed utilizing a first frame half 172 and a second frame half 174 (shown as having been removed in FIG. 8, but shown as being attached in FIGS. 1, 2 and 6). The first frame half 172 and the second frame half 174 are adapted to be separable. In use, the halves 172 and 174 connected together by a virtue of a plurality of matching attachment posts 176 which are formed in each of the frame halves 172 and 174.

Each frame half 172 and 174 is formed in a general "T" shape and includes a handle tube portion 178 which extends about a portion of the longitudinal handle tube 86, and a grip tube portion 180 formed at right angles to the handle tube portion 178. The handle tube portion 178 is provided, in the preferred embodiment 10, with a plurality of reinforcing ridges 182. Both the handle tube portion 178 and the grip tube portion 180 are substantially hollow to receive other components of the hand grip subassembly 32.

An insert member 184 is adapted to fit inside the handle tube portion 178 and provide the interface between the grip frame structure 170 and the longitudinal handle tube 86. The insert member 184 includes a handle insert portion 186 which is adapted to fit inside the hollow longitudinal handle tube 86 and to be secured therein either by an adhesive 188, as shown, or by a frictional fit or some other securing method. A stop ring 190 formed on the insert member 184 limits the degree to which the handle insert portion 186 may be inserted into the longitudinal handle tube member 86 and also provides the greatest diameter portion of the insert member 184 to allow the handle tube portion 178 to rotate smoothly about the insert member 184. A second ring, designated as a rotational ring 192, is situated on the insert member 184 at a position longitudinally displaced from the stop ring 190, to provide a balanced rotation base.

A center portion 194 of the insert member 184 extends between the stop ring 190 and the rotational ring 192. Within the center portion 194 are formed a pair of rocker aperture 196 which are adapted to fit over two of the attachment posts 176 formed in the frame halves 172 and 174. When the frame halves 172 and 174 are mated together the mated attachment posts 176 will extend through the rocker apertures 196 and hold the insert member 184 in place within the handle tube portion 178. The rocker aperture 196 are sufficiently larger than the dimensions of the attachment post 176 to allow rocking motion of the grip frame structure 170 with respect to the insert member 184.

The portion of the insert members 184 situated beyond the rotational ring 192 from the center portion 194 includes a spring tube portion 198 which partially circumferentially surrounds a spring member 199. The spring member 199 is held in place within the spring tube portion 198 by a terminal spring washer 200 held in position by a spring screw 202 secured into a screw post 204 adjacent to the rotational ring 192.

The ends of the spring member 199 are formed to extend radially outward from the insert member 184 and to engage the handle tube portion 178. These ends include a first spring tip 206 and a second spring tip 208 which are arrayed on opposite sides of a separation protrusion 210 formed on the insert member 184. Since the force bias of the spring member 199 is arranged so as to urge the spring tips 206 and 208 circumferentially toward each other, the separation protrusion 210 is necessary to limit such movement. The spring tips 206 and 208 are positioned within the handle tube portion 178 in such a manner that they bracket a limiting protrusion 212 formed in the interior surface of the handle tube portion 178. The positions of the spring tips 206 and 208 limit the amount of rotation of the hand grip structure 170 with respect to theinsert member 184 (rotation is limited to 50 to 60 degrees total, 25 to 30 degrees in each direction). The spring tps 206 and 208 are biased by the spring ember 199 so as to urge the hand grip structure 170 to a rotational position which is midway between the extremes provided by the biasing force of the spring member 199. The strength (resistance) of the spring member 199 is selected such that the golfer may readily partially rotate the hand grip 32 with respect to the longitudinal handle member 84 when desired, but to be strong enough to resist inadvertent rotation. This arrangement and selection results in the spring tips 206 and 208 maintaining a balanced (self centering) orientation, with the grip tube portion 180 rotational force to the hand grip 32. In this orientation, as is also shown in FIG. 8, the center portion 194 is essentially flat with respect to the major axis of the hand grip portion 180.

A rocker switch 214 is mounted within the grip tube portion 180, on properly situated mounting protrusion 216 formed on the interior surface of the grip tube 180, so as to be held in position with the rocker switch 214 having a pair of arms bracketing the center portion 194 of the insert member 184. When the hand grip 32 is rotated with respect to the longitudinal handle tube 86, the center portion 194 will be rotated such that one or the other of the arms of the rocker switch 214 will be activated. The rocker switch 214 is utilized to send signals relating to turning the cart 10 to the electrical subassembly 38. When the user rotates the hand grip 32 on the handle tube 86, the activation of the rocker switch 214 will cause power to be cut to either the first drive wheel subassembly 18 or the second drive wheel subassembly 20, depending upon the direction of rotation. This will allow one wheel to continue rotating while the other is effectively stopped, thus providing the turning of the device. In this manner, the golfer can manually control the direction of the golf cart 10 by rotating the handle grip 32 about the longitudinal handle tube 86.

The electrical signals from the rocker switch 214 are delivered over the electrical wiring 49 to a circuit board member 218 situated within the grip tube 180. The circuit board tube 218 is also supported on support protrusions 216 formed within the grip frame structure 170. The circuit board 218 provides a location in which the various control signals which are generated within the hand grip subassembly 32 are collated and delivered to the remainder of the electrical subassembly 38.

The circuit board 218 includes, mounted on one side thereon, an activation switch 220. The activation switch 220 is adapted to mate with a switch button 222 which extends through a button aperture 24 in the side of the grip frame structure 170 such that the switch button 222 is accessible to the golfer. The activation switch 220 is a "click-on, click-off" type which is put in the "on" position by one push of the switch button 222 and is converted to the "off" position by a second push of the switch button 222. A biasing spring 226 is provided to urge the switch button 222 out of direct contact with the activation switch 220 when the golfer does not wish to change the "on" or "off" position of the motor.

The activation switch 220 is utilized to be a secondary "on/off" control for the golfer. In order for the golf cart 10 to operate the main "on/off" switch 55 must be in the "on" position to allow power to be delivered to any of the components of the electrical subassembly 38. However, when the golfer determines that it is appropriate to manually activate the golf cart 10 to move forward, the golfer must either utilize the timer control 150 situated on the manual control box 34 or must utilize the activation switch 220 on the handle grip 32. Either of these methods will result in power being delivered to the motor subassembly 26 and cause the golf cart 10 to move forward.

The speed at which the golf cart 10 is adjusted by the golfer from the hand grip subassembly 32 by utilization of a speed control knob 228, situated at the end of the grip tube portion 180. The speed control knob 228 may be rotated to control a variable resistor 230 which is mounted within the grip tube portion 180 on support protrusion 216 and held in position by a fastening nut 232. The speed control knob 228 and the associated variable resistor 230 are used to modify the effective power being delivered to the electrical disk motors 118 and thus to control the rolling speed of the golf cart 10. In this manner, the golfer may control the speed of the golf cart 10 from the handle grip 32 to whatever walking speed or travel speed is desired.

Figure 10:
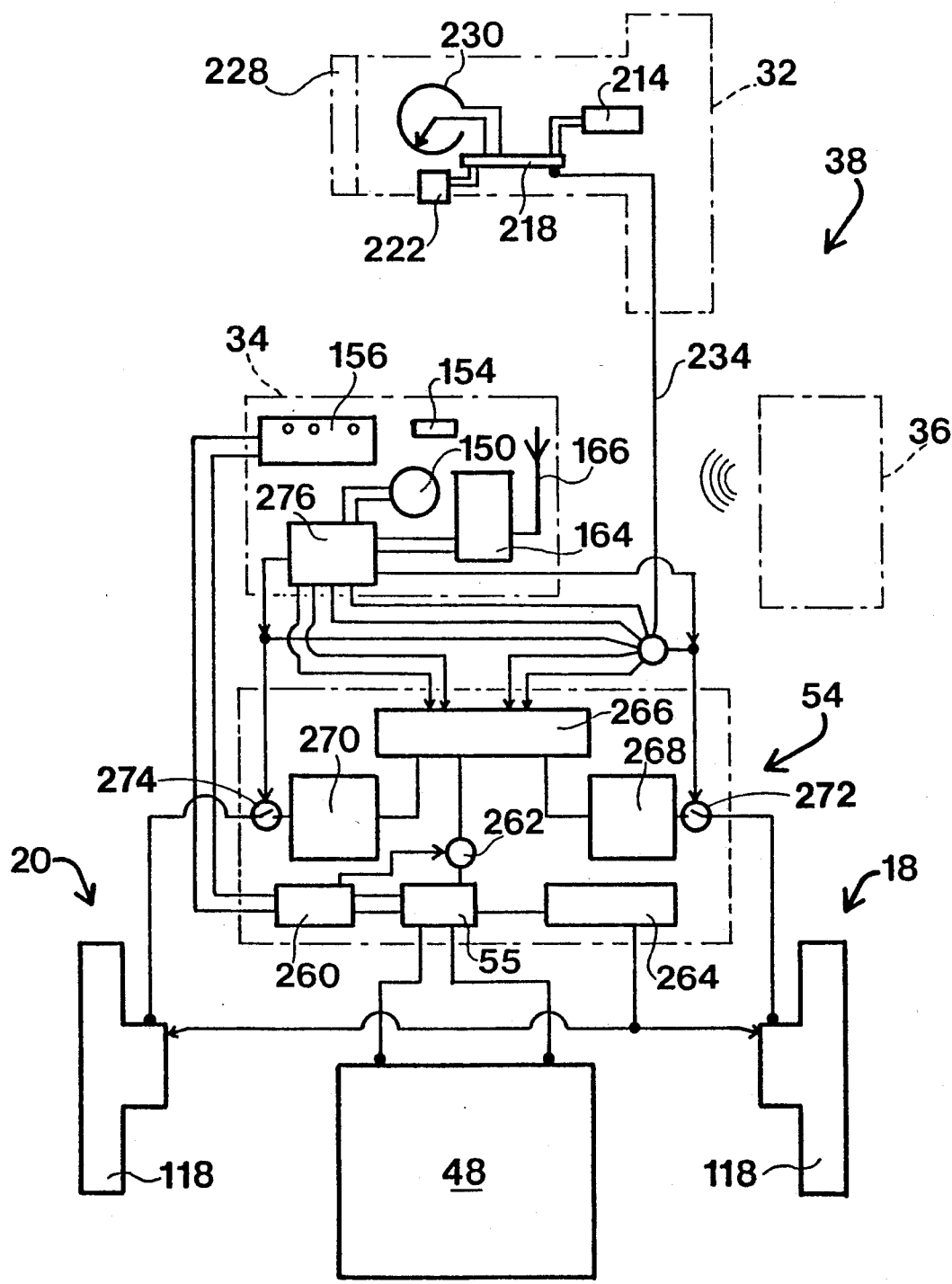
FIG. 10 is a schematic illustration of the electrical subassembly.

The output of the variable resistor 230 is delivered to the circuit board 218 where the signals from the variable resistor 230, the rocker switch 214 and the activation switch 220 are then fed into a grip control cable 234 which carries the electrical signals from the hand grip portion 32 to the remainder of the electrical subassembly 38, as is more thoroughly discussed in respect to FIG. 10.

The final mechanical portion of the golf cart assembly 10 is the optional remote control subassembly 36. By utilizing the remote control unit 36 the golfer may control the speed and direction of the golf cart 10 from a position wherein it is not comfortable or feasible to utilize the manual controls located on the manual control box 34 and the handle grip subassembly 32.

Figure 9:
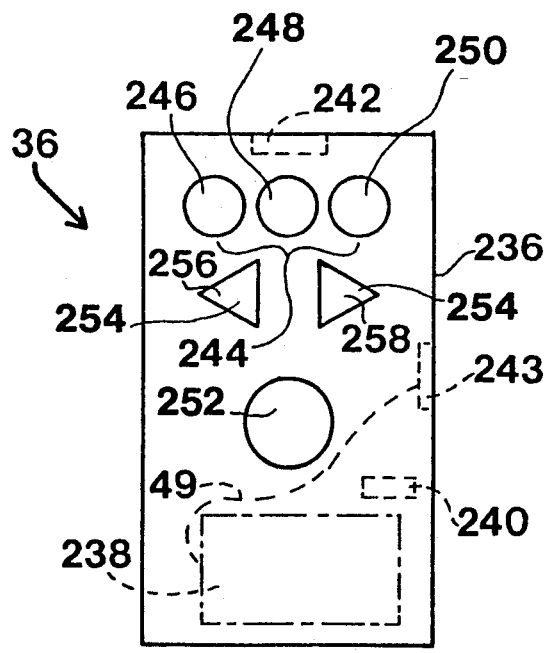
FIG. 9 is a top plan view of a remote control unit.

As illustrated in FIG. 9, the remote control subassembly 36 includes a controller case 236 which has a variety of elements enclosed therein. Some of the significant elements are illustrated in phantom in FIG. 9. These include a remote battery 238 which provides power to the electrical components of the remote controller 36, a frequency selector module 240 which is adapted to be set at the same setting as the frequency selector module 240 of the manual control box 34, thus allowing the modules to communicate properly. A transmitter 242 is also situated within the remote controller 36 for transmitting electromagnetic signals to the antenna 166 situated within the manual control box 34. A remote on/off switch 243 is also utilized to provide a master power activation mechanism for the remote control unit 36.

A variety of user selectable control elements are accessible on the surface of the controller case 236. These includes three speed control buttons 244 which are utilized to activate and control the speed of the golf bag cart 10. The speed control buttons 244 include a slow button 246, a medium bottom 248 and a fast button 260. The user may push any of the speed control buttons 244 to send a signal to the golf bag cart 10 to proceed forward at a relatively low, medium or fast speed, at the user's option. The power levels of the power delivered to the electrical disk motors 118 by activation of the various speed control buttons 244 are preselected and programmed into the remote control module 164.

The speed control buttons 244 each operate to combine the functions of the activation switch 220 and the speed control knob 228 of the hand grip subassembly 32. The speed control buttons 244 both activate the power delivery to the disk motors 118 and also set the level of power delivery. A large centrally located stop button 252 on the remote controller 36 provides the means for sending a stop command to the golf cart 10. The stop button 252 cuts power to both motors 118 and causes the golf cart 10 to cease motion.

The direction of travel of the golf cart 10 may also be controlled by the user utilizing the remote controller 36. A pair of directional controls 254 are provided on the controller case 236. The directional controls 254 include a left button 256 and a right button 258. By pushing one of the directional control buttons 254 the user accomplishes the same effect as manually rotating the grip tube portion 180 of the hand grip 32. Thus the directional controls buttons 254 correspond in function to the rocker switch 214 in that activation of the directional control 254 cuts power to one or the other of the drive wheel subassemblies 18 and 20. In this manner, the golfer is able to control the speed and direction of the motion of the golf cart 10 from a remote location.

The interconnection of the electrical subassembly 38 is illustrated in a block diagram type schematic fashion in FIG. 10. In this illustration it may be seen that the electrical subassembly 38 controls and interconnects the various functions of the other subassemblies. The portions of the electrical subassembly 38 which are contained in the previously described subassemblies are illustrated in FIG. 10 as being surrounded by dotted lines. It is understood that the various individual components are shown in block diagram and schematic fashion only and are not specific as to the precise nature of the components. The components utilized are conventional in nature and would be readily recognized by those skilled in the art.

The electrical power from the battery 48 is carried through the remainder of the electrical subassembly 38 by a variety of electrical wires 49, sometimes combined into cables such as the grip control cable 234. The terminals of the battery 48 are connected to the main power unit 54 and initially delivered to the on/off power switch 55. The main on/off power switch 55 is manually activated by the user. A on/off power switch 55 must be in the "on" position for any of the electrical subassembly 38 to operate. An adjunct of the circuit includes battery power analyzer 260 which is utilized to analyze the amount of power remaining in the battery 48. One output of the battery power analyzer 260 is delivered to the manual control box 34 and specifically to the low battery buzzer 154 and the battery level indicator lamps 156. As discussed previously, depending upon the level of power remaining in the battery 48 the appropriate indicator lamp 156 will illuminate so that the user is aware of the number of holes of operation that are remaining in the battery 48. When the battery 48 reaches a selected low level where it is necessary to warn the user that the power is about to run out, the battery buzzer 154 is activated.

A further output of the battery power analyzer 260 is delivered to a low battery cutout switch 262. The low battery cutout switch 262 interrupts the power circuit for delivering power to the electrical motors 118 when battery power level drops below a preselected minimum. The low battery cutout switch 262 is necessary to prevent damage to the motors 118 by operating them at a lower voltage than their voltage rating.

From the on/off power switch 55, one side of the line goes to an overcurrent cutout analyzer 264. The overcurrent cutout analyzer 264 is utilized to prevent unduly high current being delivered to the electrical motors 118, which excess current could cause damage.

From the overcurrent cutout analyzer 264 this side of the line goes directly to each of the electrical motors 118 contained in the first power drive wheel subassembly 18 and the second power drive wheel subassembly 20.

The opposite side of the circuit delivers power from the on/off power switch 55 to a pulse width modulator subcircuit 266. The pulse width modulator subcircuit 266 modifies the effective power delivered to the motors 118 by altering the pulse width of the cycles without altering the voltage. This is also desirable in order to obtain successful operation of the motors 118 without potential damage. Input to the pulse width modulator subcircuit 266 is received from the variable resistor 230 attached to the speed control knob 228 and also from the speed control buttons 244 of the remote control unit 36. The speed control signal delivered to the power modulator 266 are delivered equally to each of the wheels 18 and 20 such that, unless other components are activated, the wheels will turn at the same speed. The pulse width modulator 266 outputs power signals to a first field effect transistor (FET) 268 and a second field effect transistor 270. The FET's 268 and 270 actually provide the modified drive current to the electrical motors 118 of the first drive wheel subassembly 18 and the second drive wheel subassembly 20, respectively.

From the respective FET's 268 and 270 the circuit is continued and completed by connection to the respective drive motors 118. In each circumstance the circuit may be interrupted intermediate the FET's 268 and 270 and the respective drive motors 118 by a first cutout relay 272 or a second cutout relay 274. The cutout relays 272 and 274 are utilized to interrupt the power to one of the respective drive motors 118 when the user wishes to turn the golf cart 10. The turning is accomplished by cutting power to one drive wheel subassembly while maintaining power to the other, thus causing the power drive wheel to turn the golf cart 10. The input to the cutout relays 272 and 274 is derived from the rocker switch 214 in the hand grip 32, in manual control mode, or from the directional controls 254 on the remote control unit 36. In this manner, the first cutout relay 272 and the second cutout relay 274 may be operated independently to accomplish maneuvering of the golf cart 10.

The cutouts relays 272 and 274 may also be utilize in tandem to provide methods of cutting power to the entire drive circuitry. The normal operation of the unit 10 has the cutout relays 272 and 274 in the open position with no power being delivered to either of the drive wheel subassembly 18 or 20. The circuit is completed by mutually closing the circuits with the motors 118 by mutually activating the cutout relays 272 and 274 when an activation signal is received from either of the activation switch 220, the timer 150, or one of the speed control buttons 244 of the remote control unit 36. An appropriate signal from any of these sources will complete the drive circuitry and deliver the modulated power to the electrical motors 118 and thus cause the golf cart 10 to move forward. It is noted that nothing in the electrical subassembly 38 provides a reverse directional operation for the motors 118. The entire unit 10 is manufactured to be light enough in weight so that it may be manually maneuvered, if it is necessary to proceed in a reverse direction. Therefore, no reverse motor control is required.

As shown in FIG. 10, the various electrical control signals from the remote control unit 36, the handle grip subassembly 32 and the manual control unit 34 are distributed and controlled by a second circuit board 276, situated within the manual control unit 34. The second circuit board 276 relays and distributes the control signals through the power circuitry, primarily the pulse width modulator 266 and the cutouts relays 272 and 274.

The components utilized in the electrical subassembly 38 are conventional in nature and are well known to those skilled in the art. Substitution of various components is possible without altering the overall performance of the invention 10. Alternate circuit arrangements are also contemplated.

Those skilled in the art will readily observe that numerous other modifications and alterations of the apparatus and assemblies of the present invention may be made while retaining the teachings of the invention. Accordingly, the above disclosure is not intended as limited. The appended claims are therefore to be interpreted as encompass the entire spirit and scope of the invention.

INDUSTRIAL APPLICABILITY

The self propelled golf bag cart assembly 10 of the present invention is adapted for use in any circumstance wherein a person wishes to walk during a round of golf while having the burden of the golf bag and clubs carried by a mechanical device. As such, the invention 10 is adapted to be utilize on any of over thousands of golf course in which golfers are permitted to walk and to utilize bag cart devices. The invention 10 is even adapted for utilization on particularly hilly courses since it has sufficient power to climb most inclines and also has braking capability to prevent runaways.

A description of a typical usage of the self powered golf bag cart 10 of the present invention follows. Ordinarily, the cart 10 will be stored in an automobile truck or, more typically, in a garage or closet between usages. During this time the battery 48 will ordinary be connected to a conventional battery charger unit to charge the battery 48 to full power and maximum usage potential.

The fully charged cart 10 would then be transported to the golf course and converted from the storage mode of FIG. 6 to the use mode illustrated in FIGS. 1 and 2. This is accomplished by rotating the caster subassembly 28 about the bottom batteries tube 44 and the caster pivot mount 60 and 62 to the use position in which circumstance the caster wheel 74 extends downward.

The handle subassembly 30 is rotated out so that the hand grip 32 is at an appropriate height for the user and the grip tube 170 is vertically oriented. The drive wheel subassemblies 18 and 20 are also moved from the storage position of FIG. 6 to the use position of FIG. 1. This is accomplished in two steps. The lock bar 132 is manually pulled to overcome the urging force of the spring cord 136 so that the lock bar 134 is disengaged from the storage mode notch 142. The shoulder plates 88 are then manually rotated to a position where the load bearing cylinders 105 are rotated to the opposing ends of the respective cylinder receiving slots 127 and the lock bar 134 is aligned with the use mode notch 140. Releasing the lock bar 134 into the use mode notch 134 will then secure the shoulder plates in position.

The shoulder subassemblies 22 are then extended laterally by disengaging the arm lock 104 from the storage mode position and manually extending the wheel subassemblies 24 outward from the longitudinal axis I1. When the maximum extension has been achieved (FIG. 1), the arm lock 104 is then moved into position to hold the arm members 89 in a separated orientation so that the wheel subassemblies 24 are at maximum separation from each other.

At this point, the golfer would ordinarily place the golf bag 12, including golf clubs 14, on the golf bag cart 10 in such a manner that the bottom of the golf bag 12 is supported by the bag bottom support tube 64 and the tube portion of the golf bag 12 is supported on the first frame tube 40 and the second frame tube 42. The golfer may elect to secure the golf bag 12 to the golf cart 10 by straps, cords or other means or the golfer may rely on gravity to hold the golf bag 12 in place.

When the golf bag cart 10 has been converted to the use mode and the golf bag 12 has been secured thereon, the cart 10 is ready for self powered operation. In order to accomplish the self powered operation, the golfer will turn the main on/off switch 55 to the "on" position to activate the power to the electrical subassembly 38. The golfer then makes a selection as to whether is desirable that the golf cart 10 be operated by manual controls or by remote control. In the event that the golfer selects manual control the hand grip 32 is a primary control mechanism, in remote mode the remote control unit 36 is utilized. The electrical subassembly 38 includes components allowing both methods to be concurrently utilized, with the remote signals overriding contrary manual signals.

The golfer may manually activate the golf bag cart 10 by depressing the activation button 222 on the activation switch 220. The switch button 220 is situated on the hand grip 32. The golfer may then walk behind the golf bag cart 10, while holding the hand grip 32, and utilize the controls of the hand grip 32 to control the cart 10. It is noted that in operational usage, the caster subassembly 28 is the leading component of the motion of the golf cart 10 while the handle subassembly 30 is the trailing component.

The golfer may stop the motion of the cart 10 by a second pressing of the activation switch button 222. The speed control knob 228 may be utilized to adjust the speed of the bag cart 10 to the golfer's desired walker speed.

When it is desired to turn the cart to the left or the right, the handle grip 32 is then rotated about the axis of the longitudinal handle tube 86 such that the rocker switch 214 is activated. When a turn is desired a rotation of the grip tube portion 180 will activate the rocker switch 214 such that power is cut to either of the first drive wheel subassembly 18 (left turn) or the second drive wheel subassembly 20 (right turn). The turn mechanism is self centering and will revert to straight line motion when the grip tube 180 is released.

In this manner the golfer may manually control the motion, speed and direction of the golf bag cart 10 from the hand grip 32 while walking along behind the cart 10. If no turns are anticipated the golfer need only initiate motion of the cart 10 by a push of the activation switch 222 then walk along the beside the cart with no additional control until stoppage is desired, in which case a second push of the activation switch 220 will stop the cart 10. A simple joggling of the grip tube portion 180 may be utilized for fine turning control from a walking position by the cart 10.

Another method of achieving straight line translation without the golfer maintaining a grip on the hand grip 32 utilizes the timer control 150 situated on the manual control box 34. The golfer may set the timer control 150 to activate the electrical disk motors 118 for a selected period (5 to 15 seconds in the preferred embodiment 10). By turning the control knob 150 to a desired length of time, the golfer may send the cart 10 ahead for this length of time in an unattended mode. Even when utilized in timer mode the direction of the cart may be modified utilizing the handle grip 32, if desired. However, the cart 10 my be left totally unattended to traverse a straight path way during the time of mode operation.

In the event that the golfer desires to use the golf cart 10 in remote control mode the optional remote control unit 36 must be utilize. If the remote control mode is to be utilized the manual control box 34 must be equipped with the optional remote control module 164 and a receiving antenna 166. Furthermore, the frequency selector module 168 of the manual control box 34 and the frequency selector 240 of the remote control unit 36 must be set to the same position such that the remote control unit 36 may communicate effectively with the remote control module 164. The preferred remote control module 36 utilizes radio frequency control transmission mechanisms. The remote on/off switch 243 is put in the "on" position to initiate control signal transmission.

Assuming that the remote battery 238 has sufficient power to deliver signals through the transmitter 244, the golfer may then control the operation of the golf cart 10 utilizing the remote control unit 36. When forward motion is desired the golfer merely activates one of the three speed control buttons 244 (FIG. 9). The various speeds for the slow button 246, the medium bottom 248 and the fast button 250 would have been preset and the degree of power delivered to the drive wheel module 18 and 20 through the respective FET's 268 and 270 and the pulse width modulator 266 will be adjusted accordingly. When the user wishes to stop the motion of the golf bag cart 10 utilizing the remote control unit 36, it is necessary to press the stop button 252. Pressing the stop button 252 sends a signal to the remote control module 164 which activates the second circuit board 276 and opens the drive power circuitry by simultaneously opening the first cutout relay switch 272 and the second cutout relay switch 274. This stops the delivery of power to the electrical disk motors 118 and stops the cart 10.

When a golfer wishes to turn the self powered golf bag cart 10 the directional controls 254 are utilized. The left button 256 results in a left turn by operating in a manner similar to the rocker switch 214 and cutting power to the first drive wheel subassembly 18. Similarity, the right button 258 cuts power to the second drive wheel subassembly 20 and results in a right turn. The duration of the turn will be controlled by the duration of pressing at the appropriate directional control button 254. By maintaining pressure on one of the directional controls button 254 the golfer could cause the golf bag cart 10 to turn around in a tight circle, should this be somehow desirable. Release of the directional control button 254 restores power to the deactivated drive wheel subassembly and results in straight line travel once again.

The golfer should maintain an awareness of the condition of the battery power level indicator lamps 156 on the manual control box 34. The lamps 156 provide the user with an indication as to how much power remains in the batter 48 and as to whether the golfer should continue to utilize the golf cart 10 for additional holes of golf. Especially when the red lamp 162 is illuminated, the golfer should consider immediately returning to the club house or the vehicle so that the battery 48 may be recharged prior to further usage.

As shown above, the self powered golf bag cart 10 of the present invention is extremely versatile and simple for use by the average golfer. The golf bag cart 10 is adapted for use on all varieties of terrain upon which a rolling vehicle may be taken. The structure of the cart 10 is especially selected to provide excellent traction while minimizing potential damage to the fairways and other grounds of the golf course. Accordingly, the inventive golf cart 10 is likely to be accepted by golf course owners when other power vehicles are unacceptable.

For all of the above reasons, in light of the objects and advantages set forth above, it is expected that the self powered golf bag cart 10 of the present invention will have extremely wide market acceptance and broad industrial applicability.

I claim:

1. A shoulder assembly adapted for interconnecting a first component structure and a second component structure in a plurality of orientation modes, including, at least, a compact mode and an expanded mode, comprising:

a shoulder mount attached to the first component structure, the shoulder mount including a positive integral number of arc shaped receiving slots formed therein;

a shoulder plate member for mounting on the shoulder mount in a generally planar juxtaposition therewith, so as to partially rotate with respect to the shoulder mount;

a number of support cylinders, equal to said number of said receiving slots, mounted perpendicularly on the surface of the shoulder plate facing the shoulder mount, each of said support cylinders extending through a corresponding one of said receiving slots;

a plurality of arm members extending from the shoulder plate member to the second component structure, said arm members being arrayed so as to be mutually parallel in one selected dimension, said arm members being connected to the shoulder plate member in a manner such that a limited degree of freedom is provided in a dimension perpendicular to said plane of juxtaposition, while maintaining a fixed orientation between the shoulder plate member and each of said arm members in all other dimensions.

2. The assembly of claim 1 wherein
said support cylinders are elongated and adapted to extend through a second integral number of receiving slots formed on a second shoulder mount, the second shoulder mount being attached to the first component structure at a position displaced from the attachment of the first shoulder mount, such that said support cylinders are attached to a second shoulder plate with the orientation of the second shoulder plate to the second shoulder mount being symmetrical to the orientation of the first shoulder plate to the first shoulder mount, such that two opposing shoulder plates are connected together so as to rotate concurrently.

3. The shoulder assembly of claim 1 wherein
the number of said arc shaped receiving slots is three; and
said arc shaped receiving slots are equally radially spaced about the shoulder mount.

4. The shoulder assembly of claim 1 and further including
locking means for securing the first component structure and the second component structure in each of the plurality of orientation modes.

5. The shoulder assembly of claim 4 wherein said locking means includes
an arm lock member adapted to abut against at least two of the arm members to maintain a fixed orientation of the arm members with respect to each other when said arm lock member is engaged.

6. The shoulder assembly of claim 5 wherein sid arm lock means further includes
a spring loaded lock bar structure having a lock bar member adapted to enagage a plurality of notches formed in a radial array upon the shoulder mount, said notches corresponding to the orientation modes, said lock bar being urged into engagement with said notches by spring means, the urgining of said spring means being adapted to be overcome by the user in order to convert from one orientation mode to another orientation mode.

7. The shoulder assembly of claim 1 wherein
the arm members are arrayed so as to be nearly parallel to said plane of juxtaposition in the compact mode; and
the arm members are arrayed at an angle of between 15 degrees and 25 degrees with respect to said plane of juxtaposition in the expanded mode.

8. In a shoulder assembly for a multi-wheeled cart member including a cart body and at least one pair of opposed wheel members, the improvement comprising:
providing an opposing pair of generally exteriorly flat shoulder plate members attached to the cart body, the shoulder plates having a plurality of arc-shaped slots extending therethrough;
providing an opposing pair of arm assemblies for engaging the respective shoulder plates, each arm assemlby including a shoulder disk member for juxtaposition adjacent to the shoulder plate so as to rotate with respect thereto in a plate plane parallel to the plate member, a plurality of arm members pivotally attached to said shoulder disk member at a proximal end thereof and pivotally attached to a wheel disk member at a distal end thereof, said wheel disk members being attached to respective wheel members such that said wheel disk members lie in a wheel plane generally perpendicular to the axis of rotation of the wheel member, with the wheel members being free to rotate with respect to said wheel disk members; and
providing a plurality of load bearing members extending through said arc-shaped slots and being attached to ech of said respective shoulder disk members so as to restrict the rotation of said shoulder disk members to the extents of said arc-shaped slots.

9. The improvement of claim 8 wherein
said plate plane and said wheel plane are maintained so as to be effectively parallel in all operational orientations.

10. The improvement of claim 8 wherein
the arm assemblies each include three arm members.

11. The improvement of claim 10 wherein
the locations of said pivotal attachment of said arm members to each of said shoulder disk member and said wheel disk member are arrayed in an equilateral triangle about the center of said disks.

12. The improvement of claim 10 wherein
an arm lock member is provided on a center one of said arm members, said arm lock being adapted to secure said arm members in one or more desired modes of orientation.

13. The improvement of claim 8 wherein
the load bearing members have an effective diameter of slightly less than the width of said arc-shaped slots so as to be closely slidably received in said slots.

14. The improvement of claim 8 wherein
said arc-shaped slots have an arc length such that said shoulder disk members are permitted approximately 60 to 70 degrees of rotational freedom.

15. The improvement of claim 8 wherein
the shoulder plates are further provided with an arc-shaped lockign detent including locking notches formed therein for securing the arm assemblies in at least two rotational orientations with respect to the cart member.

16. The improvement of claim 8 wherein
means are provided for locking the arm assemblies in at least two rotational orientations and at least two expansion orientations with respect to the cart member.

17. A pivotal wheel mount assembly for a golf bag cart having a cart body and two primary wheel members, comprising:
a first shoulder plate and a second shoulder plate, parallel to the first shoulder plate, each being attached to the cart body so as to extend generally perpendicular thereto, and each shoulder plate including a plurality of curved slots formed therein for slidably receiving load bearing members therethrough;
a pair of opposed arm assemblies, with each arm assembly being associated with one of the wheel members, each arm assembly including shoulder disk means adjacent to a respective one of the shoulder plates, a plurality of arm members pivotally attached at a proximal end to said shoulder disk means and pivotally attached at a distal end thereof to wheel disk means, said wheel disk means being attached to the wheel member in such a manner that the wheel member rotates with respect thereto;
wherein the pivotal wheel mount assembly is characterized by the arm assemblies being affixed to one another by said load bearing members such that said shoulder disks conjunctively rotate intermediate a storage mode position and a use mode position, with rotational locking means being provided to secure the arm assemblies in each of said mode positions.

18. The pivotal wheel mount assembly of claim 17 wherein
the pivotal wheel mount assemlby is further characterized by the arm members being pivotally attached to said shoulder disk means and said wheel disk means in such a manner that the wheel members may extend from a compact mode wherein the wheel members are positioned axially close to the cart body and an expanded mode wherein the wheel members are axially displaced outwardly from the cart body so as to provide stable rolling support thereof, with expansion locking means being provided to secure the arm assemblies in each of said compact mode and said expanded mode.

19. The pivotal wheel mount assembly of claim 17 wherein
said load bearing members are in the form of cylinders, said cylinders being affixed to said shoulder disk members in an equally radially spaced array.

* * * * *